United States Patent [19]

Ravera

[11] Patent Number: 5,382,152
[45] Date of Patent: Jan. 17, 1995

[54] DEVICE FOR THE AUTOMATIC SUPPLY OF A PRESS FOR MOULDING THERMOPLASTIC MATERIAL SHEETS

[76] Inventor: Giorgio Ravera, Via Coppieri 7/6, 10066 Torre Pellice (Torino), Italy

[21] Appl. No.: 64,988
[22] Filed: May 24, 1993

[30] Foreign Application Priority Data

May 27, 1992 [IT] Italy ............................ T092A000453

[51] Int. Cl.⁶ .................... B29C 31/00; B29C 65/00
[52] U.S. Cl. .................... 425/397; 414/225; 414/744.6; 414/751; 425/403.1; 425/436 R; 425/DIG. 118
[58] Field of Search ............ 414/225, 744.6, 744.8, 414/751; 425/253, 397, 400, 403.1, 436 R, 436 RM, 444, 452, DIG. 117, DIG. 118

[56] References Cited

U.S. PATENT DOCUMENTS

| | | | |
|---|---|---|---|
| 2,365,849 | 12/1944 | Strauss | 425/397 |
| 2,836,852 | 6/1958 | Butzko | 425/253 |
| 3,025,566 | 3/1962 | Kostur | 425/397 |
| 3,186,034 | 6/1965 | Taylor, Jr. | 425/400 |
| 3,619,864 | 11/1971 | Birch | 425/397 |
| 4,019,848 | 4/1977 | Balhorn | 425/DIG. 118 |
| 4,185,069 | 1/1980 | Smith et al. | |
| 4,257,840 | 3/1981 | Fuji | |
| 4,579,914 | 4/1986 | Repella | 425/397 |
| 4,580,964 | 4/1986 | Repella | 425/397 |
| 4,674,972 | 6/1987 | Wagner | 425/400 |

FOREIGN PATENT DOCUMENTS

| | | | |
|---|---|---|---|
| 50-40428 | 12/1975 | Japan | 425/400 |
| 959908 | 6/1964 | United Kingdom | |

*Primary Examiner*—Charles S. Bushey
*Attorney, Agent, or Firm*—Venable, Baetjer, Howard & Civiletti

[57] ABSTRACT

Apparatus for loading and unloading a frame bearing a cover material for application to a formed thermoplastic sheet, especially in the production of cover panels for motor vehicles, is associated with a press including two dies for simultaneous moulding of the sheet and application of the cover material thereto, and includes a take-up station disposed outside the press for taking up a frame and a device for automatically transferring the frame from the take-up station to a moulding station between the dies. The device includes a pair of guides supported by one of the dies, the guides extending from the take-up station to the moulding station. The device further includes a frame take-up member mounted for sliding movement along the guides and associated with an actuator for controlling movement of the frame take-up member between the take-up and moulding stations.

11 Claims, 6 Drawing Sheets

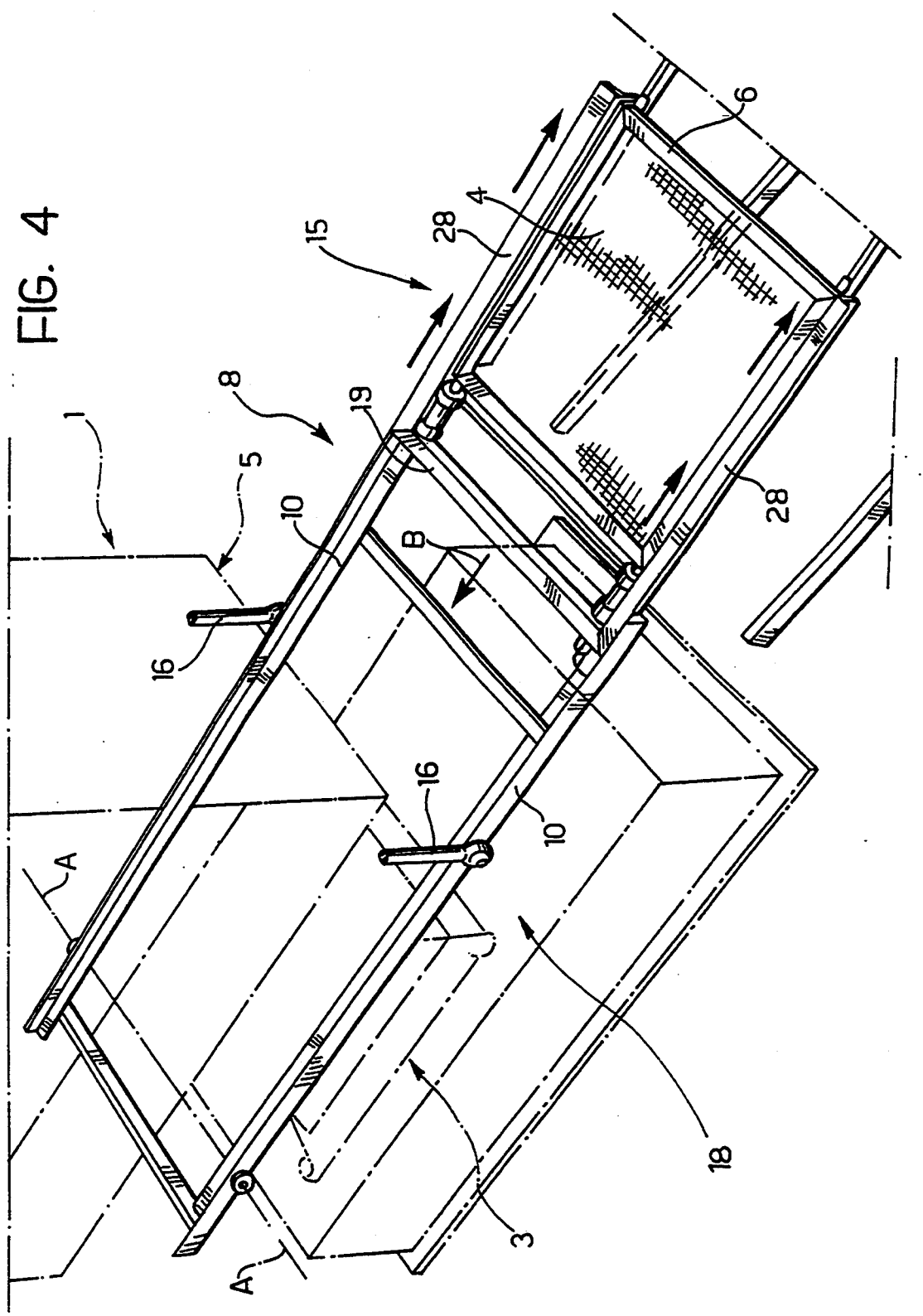

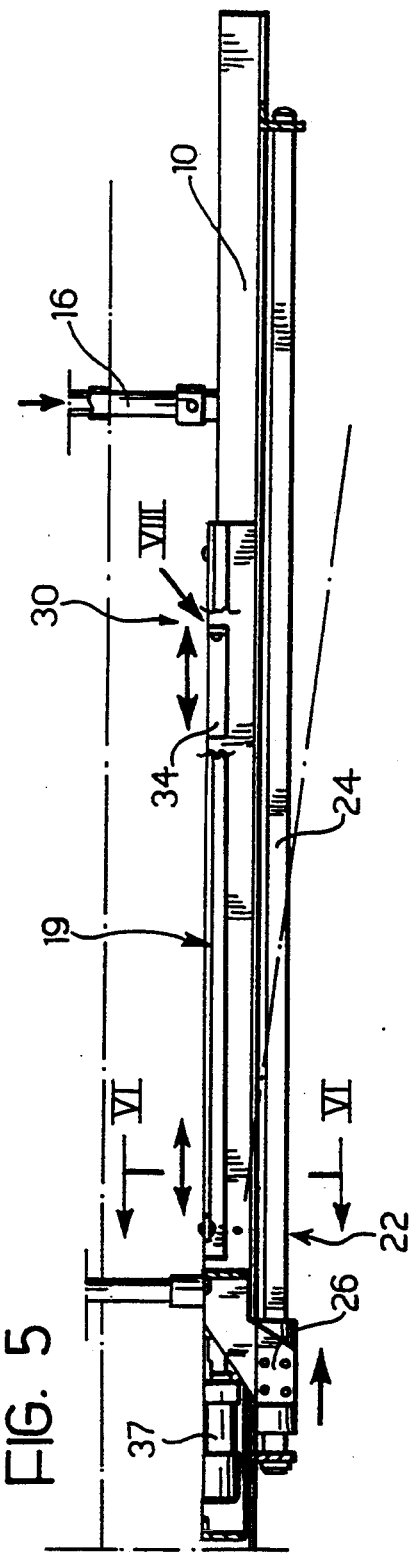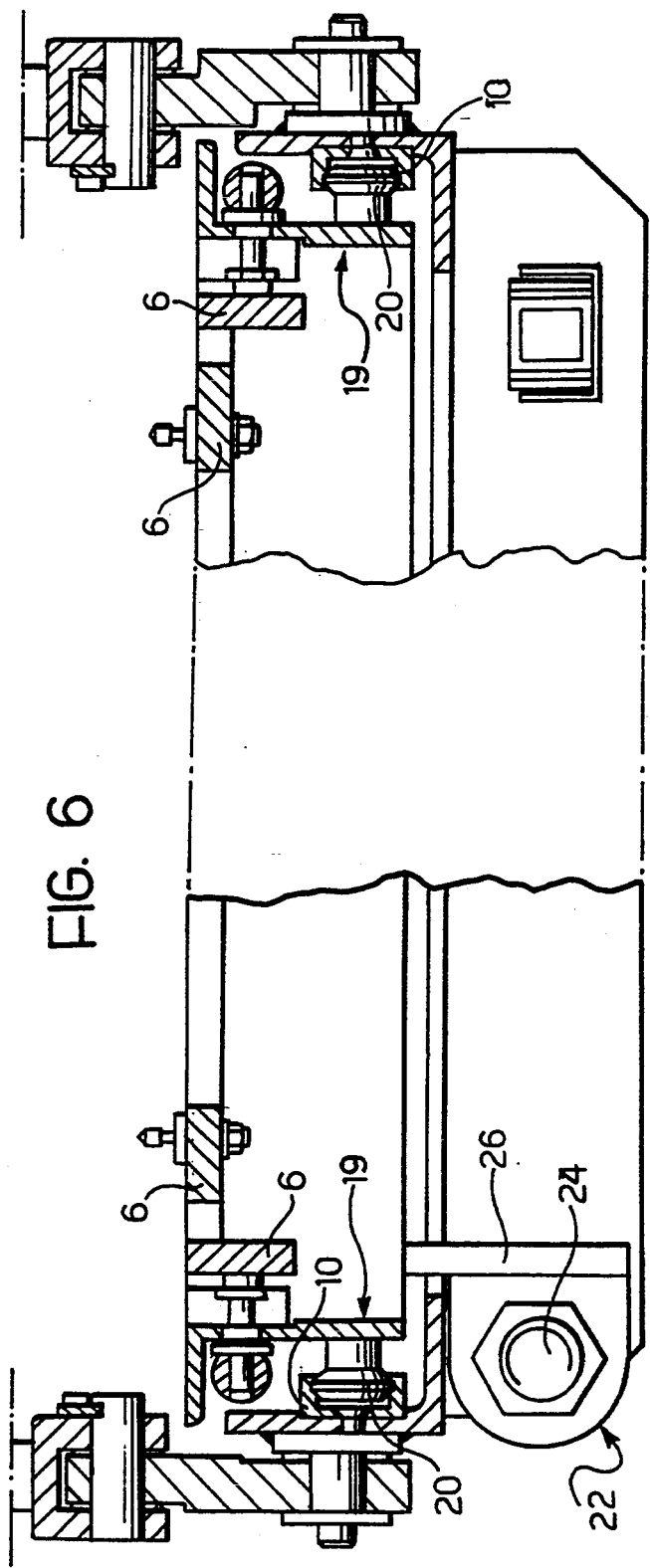

DEVICE FOR THE AUTOMATIC SUPPLY OF A PRESS FOR MOULDING THERMOPLASTIC MATERIAL SHEETS

FIELD OF THE INVENTION

The present invention relates to a device for loading and unloading a frame which bears a covering to be applied to a thermoplastic sheet. The device is associated with a press designed simultaneously to carry out moulding of the sheet and application of the covering to the surface of the sheet.

BACKGROUND OF THE INVENTION

Moulding devices are known which are designed in particular for the production of cover panels for motor vehicles, in which the sheet is heated in an oven and is automatically supplied to the press which carries out the moulding.

Automatic supply devices are also known which grasp the frame at a collection station and place it between the dies of the press. The known supply devices are very complex and expensive, and require very lengthy equipping times when the moulds are changed.

SUMMARY OF THE INVENTION

In order to overcome the above disadvantages, the subject of the present invention is an automatic frame supply device. The present invention is a device for loading and unloading a frame bearing a cover material for application to a formed thermoplastic sheet. The device is associated with a press including two dies for simultaneous moulding of the sheet and application of the cover material thereto. The device includes a take-up station disposed outside the press for taking up a frame, and a take-up assembly for grasping a frame from the take-up station to a moulding station between the dies. The take-up assembly is integral with the mould and includes a pair of guides supported by one of the dies. The guides extend from the take-up station to the moulding station. The take-up assembly further includes a frame take-up member mounted for sliding movement along the guides and being associated with an actuator for controlling movement of the frame take-up member between the said take-up and moulding stations.

The device according to the invention forms an integral part of the mould. This enables the tool equipping times to be reduced considerably, since the mould is replaced together with the supply device, which is already prepared for the new mould. This can be achieved by virtue of the fact that unlike known devices, the cost of the device constitutes only a small part of the cost of the mould.

Further characteristics and advantages of the present invention will become apparent from the following detailed description, given purely by way of non-limiting example, with reference to the appended drawings, in which:

BRIEF DESCRIPTION OF THE DRAWINGS

FIGS. 2, 3 and 4 are schematic perspective views showing the operation of the device according to the invention;

FIG. 5 is a lateral view along arrow V in FIG. 2;

FIG. 6 is an enlarged cross-section along line VI—VI in FIG. 5; and

DETAILED DESCRIPTION OF THE INVENTION

Figure 1:
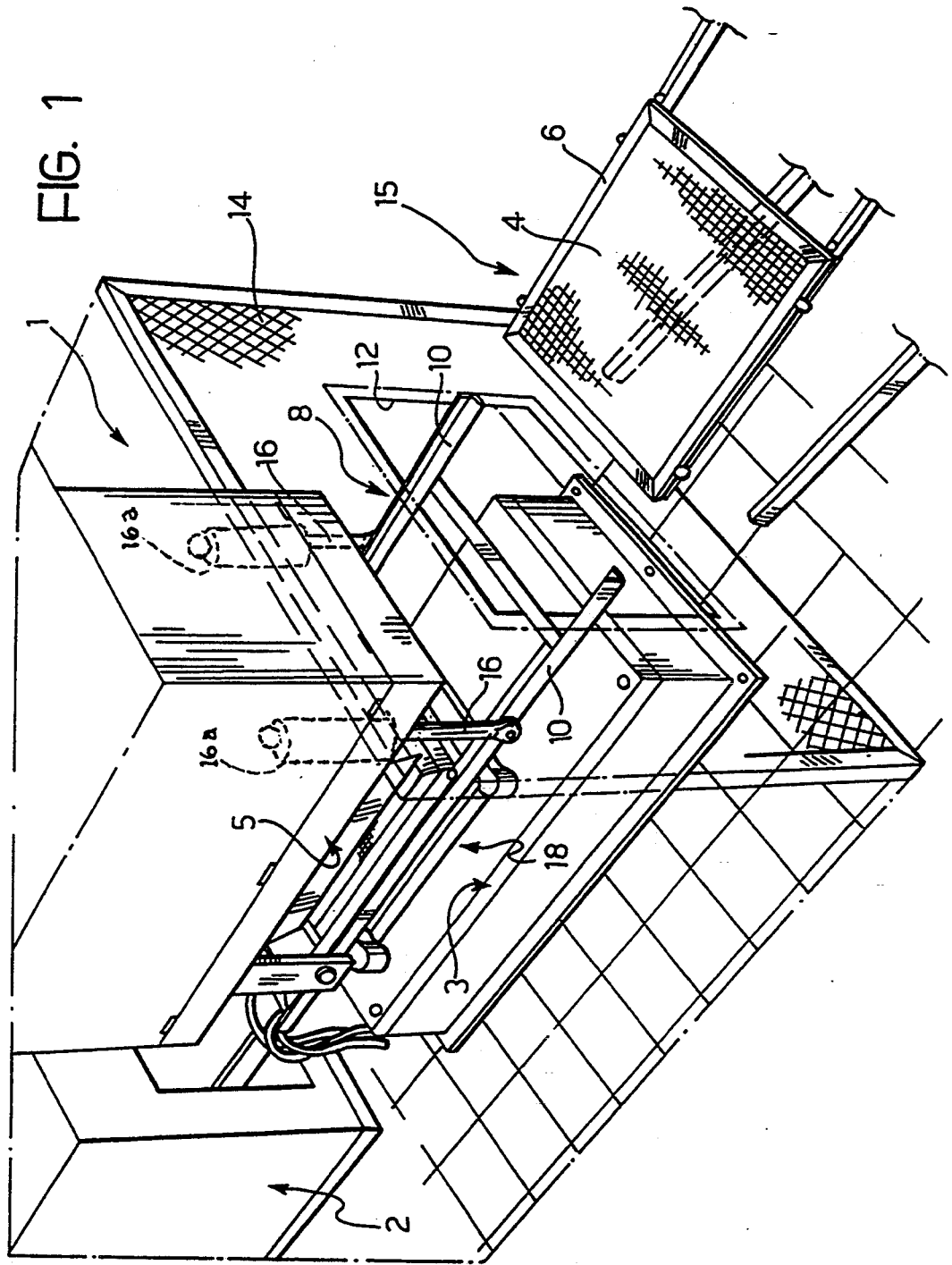
FIG. 1 is a schematic perspective view of a moulding press provided with a device according to the present invention.

With reference to the Figures, a press equipped for the production of cover panels, for example, for motor vehicle doors, is indicated 1. The press is provided, in known manner, with a fixed lower die and a movable upper die indicated 3 and 5 respectively. 2 indicates an oven for heating the thermoplastic sheets to be supplied to the press 1. The heated sheets are supplied to the press by means of an automatic device which is not described in detail, since it is beyond the scope of the present invention.

During the moulding process, each thermoplastic sheet is covered with a covering which can consist of fabric, PVC, or any other covering material. The covering for each sheet, indicated 4 in the Figures, is stretched on a quadrangular frame 6.

Figure 2:
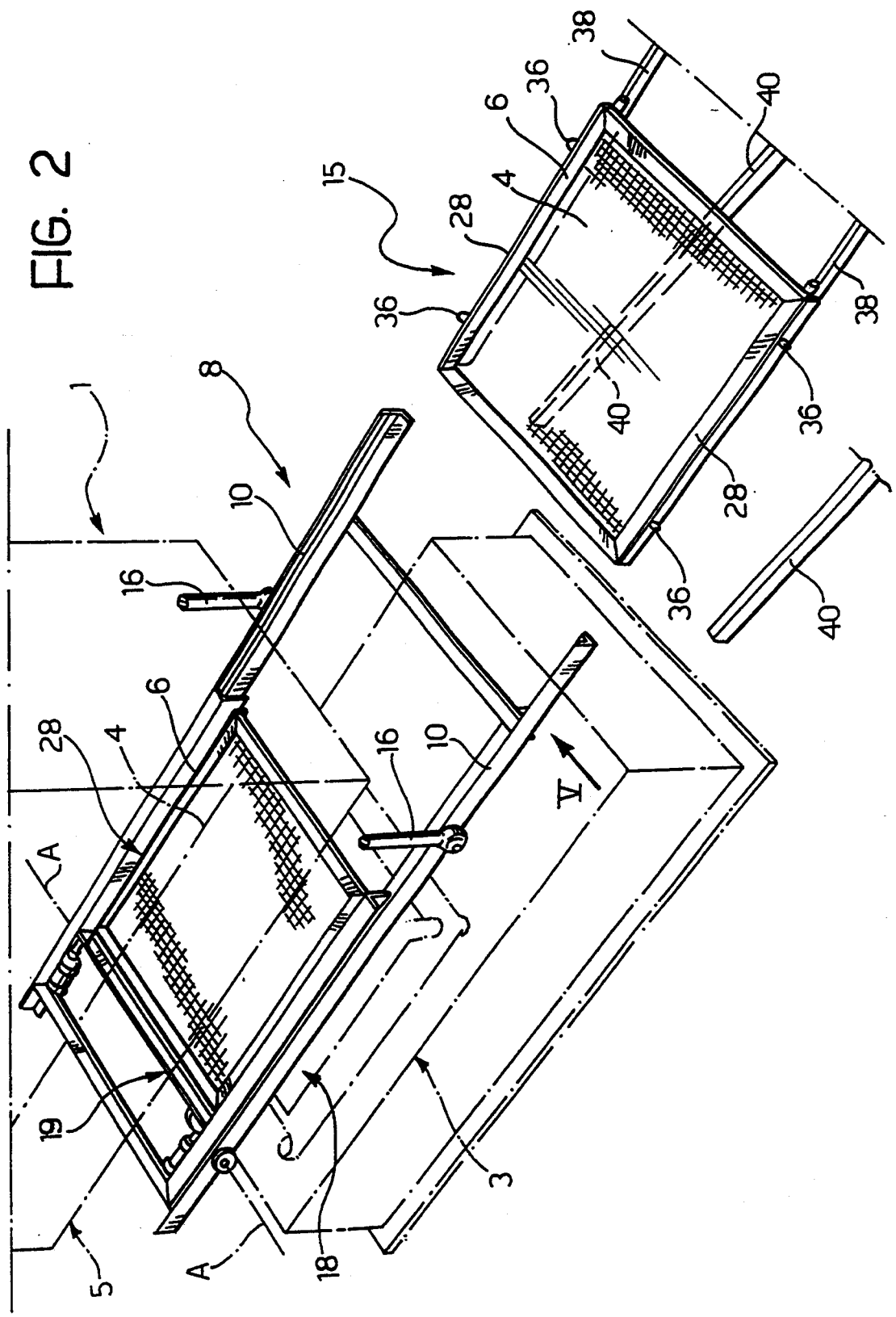
Figure 3:
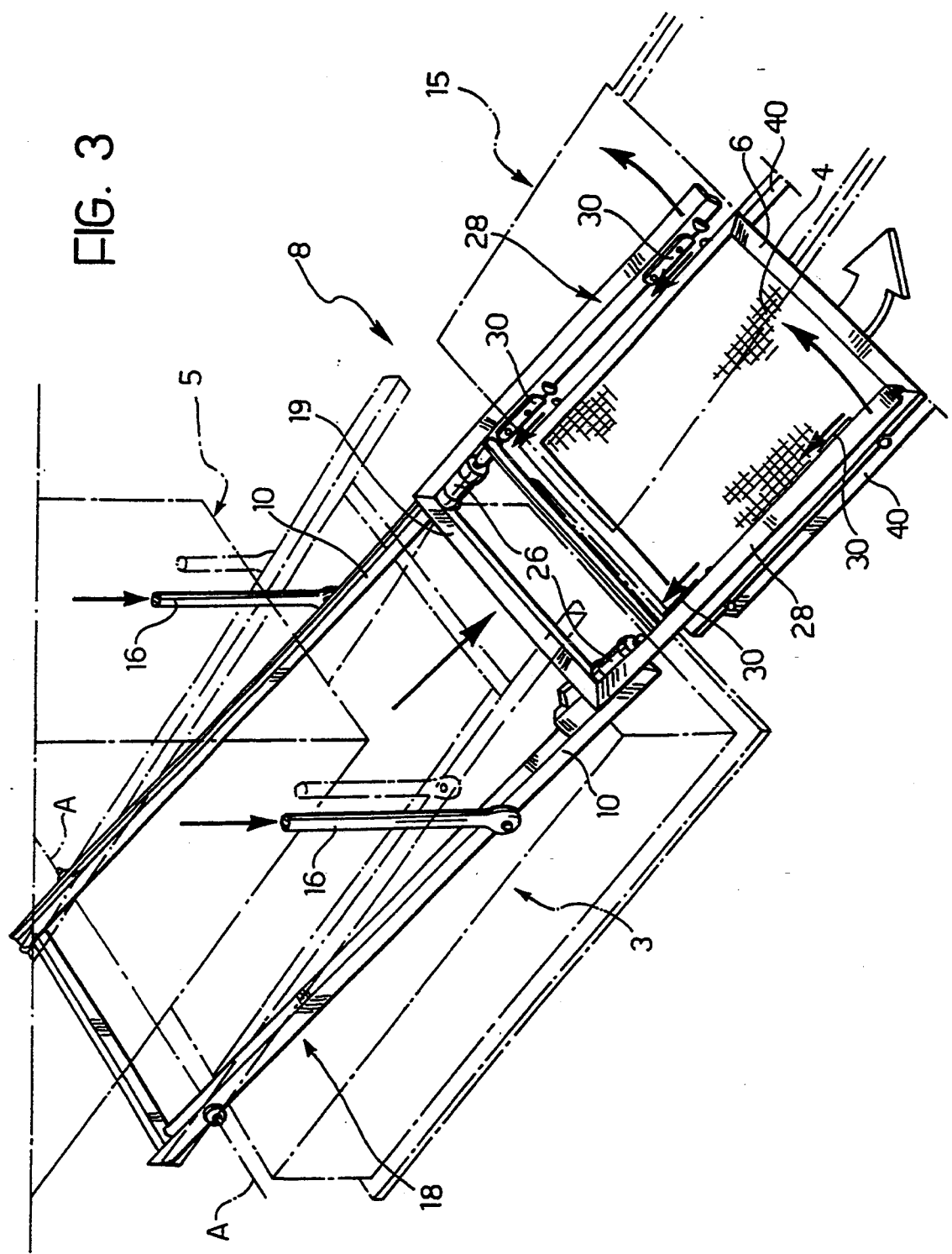

In FIGS. 2 to 4, a device for supplying the frames 6 automatically to the press 1 is indicated 8. The device 8 comprises a pair of guides 10 which are supported from the upper die 5 and form an integral part of the latter. As shown in FIG. 1, the guides 10 extend through an aperture 12 provided in a safety gate 14, which prevents access to the press 1. The guides 10 extend from a station 15 for taking up a frame 6, to a moulding station 18 disposed between the two dies of the press 1. The two guides 10 are articulated to the upper die 5, about a horizontal axis A (FIG. 2) and are connected to actuator means 16a, by means of a pair of arms 16. These actuator means are supported by the die 5, and control pivoting of the guides about the axis A, between a loading position shown in FIGS. 2 and 4, and an unloading position shown in FIG. 3.

A take-up member, indicated 19, grasps a frame 6 in the manner described hereinafter. The take-up member 19 is mounted so as to slide along the guides 10 by means of wheels 20 (FIG. 6). The take-up member 19 is moved along the guides 10 by an actuator 22 of known type (shown in FIGS. 5 and 6), consisting of a rod 24 fixed to a guide 10, on which slides a body 26 which is fixed to the take-up member 19. As shown in FIG. 3 in particular, the take-up member 19 has a U-shaped configuration, with two limbs 28 which are parallel to one another and are provided with grasping means 30 for taking up a frame 6. As shown in greater detail in FIGS. 7 and 8, each of the said grasping means 30 consists of a stop member 32 which is fixed in relation to the take-up member 19, and of a sliding latch 34. Each frame 6 is provided with four projecting pins 36 which cooperate with respective grasping means 30. The four latches 34 are connected to a single actuator 37 (FIG. 5), which controls the opening and closing movement.

The frames 6 to be supplied to the press 1 are disposed in turn in the take-up station 15, supported on rails 38. Below the take-up station 15 are disposed two inclined guides 40 which can receive a frame 6, which has completed the moulding cycle.

Figure 7:
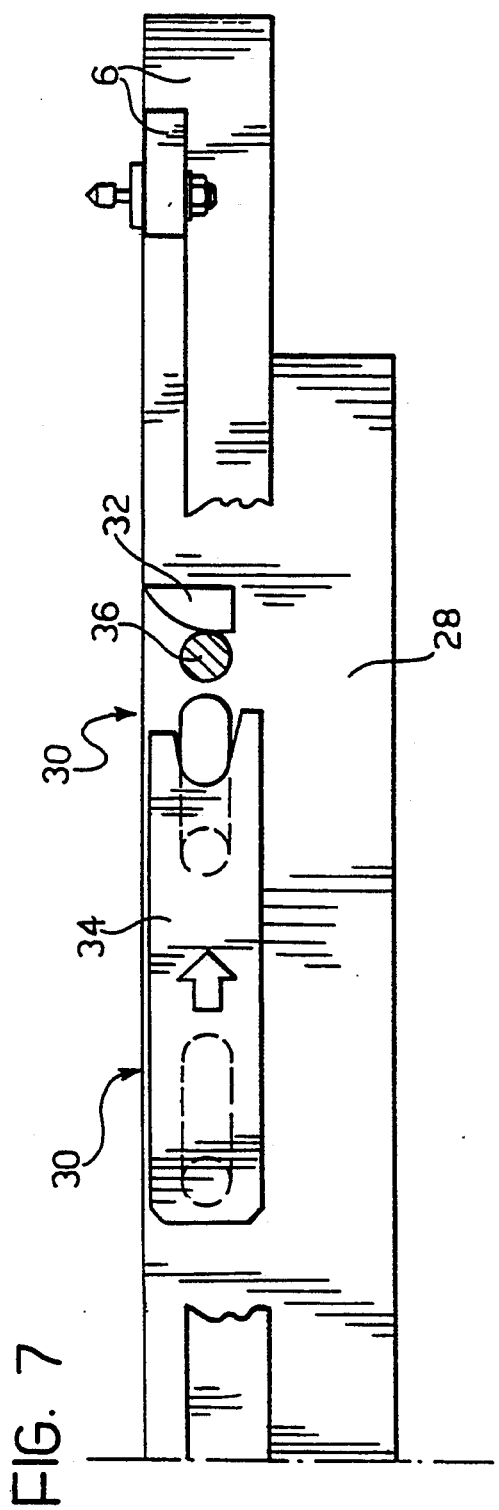
FIGS. 7 and 8 are enlarged views of the part indicated by the arrow VIII in FIG. 5, in two different operating configurations.
Figure 8:
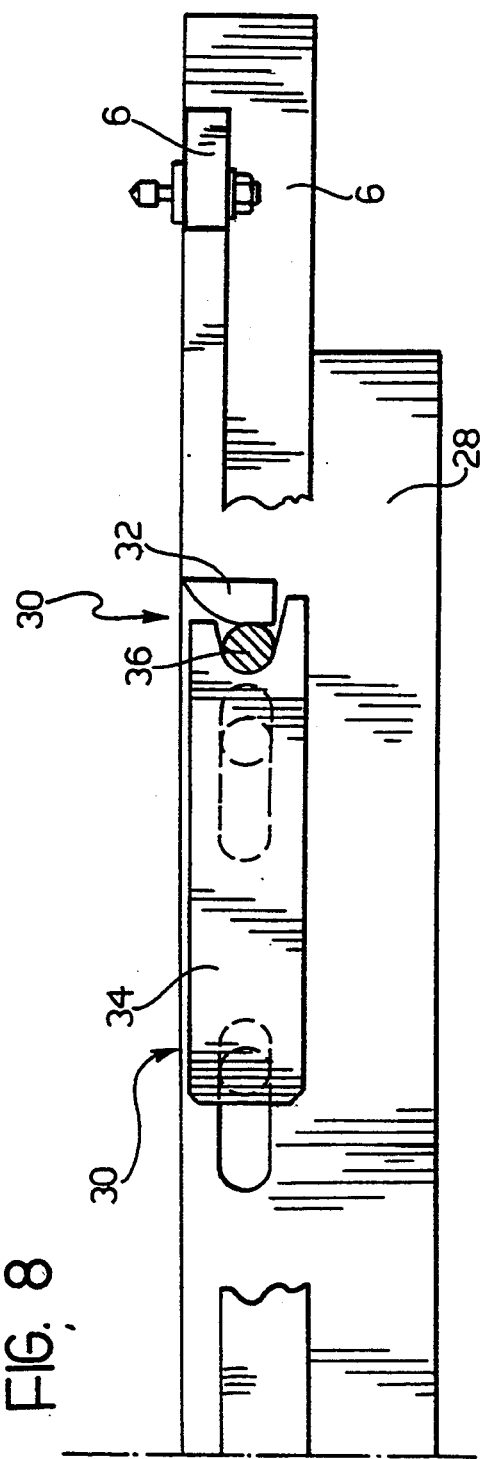

FIG. 2 shows a configuration in which a frame 6 is held by the take-up member 19 between the two dies of the press 1, whereas a further frame 6 is disposed in the take-up station 15. When the moulding operation is completed, the panel consisting of the thermoplastic sheet onto which the covering 4 has been applied, is joined to the frame 6 by some parts of the covering 4, which will then be cut. FIG. 3 shows the stage in which the frame 6 bearing a moulded panel is unloaded. In this stage the guides 10 are inclined relative to the loading position, and extend parallel to the guides 40 on which the frame 6, which has completed the moulding cycle, is deposited. The frame is unloaded by activating the actuator 37 which opens the latches 34. When a frame bearing the finished panel has been unloaded, the guides 10 are raised into their loading position (see FIG. 4). Whilst the guides 10 are being raised, the latches 34 and the stop members 32 are on opposite sides of a respective pin 36, as shown in FIG. 7. At this point, activation of the actuator 37 closes the latches 34, which adopt the configuration shown in FIG. 8. When the frame 6 has thus been grasped, the take-up member 19 moves along the guides 10 in the direction indicated by the arrow B in FIG. 4, and is inserted between the two dies of the press 1.

The loading and unloading operations can take place simultaneously with loading of a further sheet, which is placed by an automatic device, so as to rest on the lower die of the press 1. These operations can also take place without having to open and close the safety gate 14, since the operator is still outside the working area of the press 1.

The device for supplying the frames forms an integral part of the mould, and does not require any adjustment operations after the moulds have been replaced.

What is claimed is:

1. Apparatus for the automatic supply to a press of a cover material to be applied to a formed thermoplastic sheet, said press including two dies for simultaneous moulding of the sheet and application of the cover material thereto, the apparatus comprising:
    a take-up station disposed outside the press for receiving a sheet of cover material; and
    a take-up assembly for transferring said sheet from the take-up station to a moulding station between the dies; said take-up assembly being integral with the mould and further including,
        a first pair of guides supported by one of said dies and extending from said take-up station to said moulding station, said first pair of guides being movable between a loading position and an unloading position, and said first pair of guides being articulated about a transverse axis;
        a take-up member mounted for sliding movement along the first pair of guides and driven by first actuator means for controlled movement between said take-up and moulding stations, and
        second actuator means for controlling displacement of said first pair of guides, said second actuator means being operative to pivot said first pair of guides about said axis between said loading and unloading positions, said unloading position being inclined.

2. Apparatus as claimed in claim 1, further comprising a second pair of guides parallel to said first pair of guides while in said unloading position and adapted for receiving a frame therefrom upon completion of a moulding cycle.

3. Apparatus as claimed in claim 1, wherein said take-up member has a generally U-shaped configuration with two limbs which are parallel to each other for carrying a frame bearing a sheet of cover material, said take-up member bearing grasping means for grasping respective projecting parts of said frame.

4. Apparatus as claimed in claim 3, wherein said grasping means comprise a stop element which is fixed relative to said take-up member, and a latch element which slides relative to said take-up member and presses said projecting part of the frame against said stop element (32).

5. Apparatus as claimed in claim 1, wherein the press includes a safety gate having an access aperture and said guides extend through said aperture.

6. An apparatus for automatically supplying thermoplastic material sheets and cover material to a press for moulding, said press having two dies defining a moulding station for simultaneously moulding said thermoplastic sheet and applying said cover material thereto, the apparatus comprising;
    a frame bearing a sheet of said cover material for application to said thermoplastic sheet;
    a take-up station disposed outside the press for receiving said frame;
    a first pair of guides supported by one of said dies and extending from said take-up station to said moulding station, said guides being movable between a loading position and an unloading position;
    a frame take-up member mounted for sliding movement along said first pair of guides for moving said frame from said take-up station to said moulding station;
    first actuator means for controlling movement of the frame take-up member between said take-up and moulding stations; and
    second actuator means for controlling displacement of said first pair of guides between said loading position and unloading position, wherein said first pair of guides are articulated about a transverse axis, said second actuator means being operative to pivot said first pair of guides about said axis between said loading position and an inclined unloading position.

7. The apparatus as claimed in claim 6, further comprising a second pair of guides parallel to said first pair of guides while in said unloading position and adapted for receiving a frame therefrom upon completion of a moulding cycle.

8. The apparatus as claimed in claim 6, wherein said take-up member has a generally U-shaped configuration with two limbs which are parallel to each other and disposed outside the frame, said take-up member bearing grasping means for grasping respective projecting parts of said frame.

9. The apparatus as claimed in claim 8, wherein said grasping means comprises a stop element which is fixed relative to said take-up member, and a latch element which slides relative to said take-up member and presses said projecting part of the frame against said stop element.

10. The apparatus as claimed in claim 6, wherein the press includes a safety gate having an access aperture and said guides extend through said aperture.

11. An apparatus for automatically supplying thermoplastic material sheets and cover material to a press for moulding, said press having two dies defining a moulding station for simultaneously moulding said thermoplastic sheet and applying said cover material thereto, the apparatus comprising:
    a frame bearing a sheet of said cover material for application to said thermoplastic sheet;

a take-up station disposed outside the press for receiving said frame;

a first pair of guides supported by one of said dies and extending from said take-up station to said moulding station, said guides being movable between a loading position and an unloading position;

a flame take-up member mounted for sliding movement along said fast pair of guides for moving said frame from said take-up station to said moulding station, said frame take-up member having a generally U-shaped configuration with two limbs which are parallel to each other and disposed outside the frame;

grasping means carried by said frame take-up member for grasping respective projecting pans of said frame, said grasping means including a stop element which is fixed relative to said take-up member, and a latch element which slides relative to said take-up member and presses said projecting part of the frame against said stop element;

first actuator means for controlling movement of the frame take-up member between said take-up and moulding stations; and second actuator means for controlling displacement of said fast pair of guides between said loading position and unloading position.

* * * * *